(12) United States Patent
Edwards et al.

(10) Patent No.: US 12,542,808 B2
(45) Date of Patent: Feb. 3, 2026

(54) COMPUTER-BASED SYSTEMS FOR DETERMINING A LOOK-ALIKE DOMAIN NAMES IN WEBPAGES AND METHODS OF USE THEREOF

(71) Applicant: Capital One Services, LLC, McLean, VA (US)

(72) Inventors: Joshua Edwards, Philadelphia, PA (US); Bryant Yee, Silver Spring, MD (US); Armando Martinez Stone, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 105 days.

(21) Appl. No.: 18/529,562

(22) Filed: Dec. 5, 2023

(65) Prior Publication Data

US 2025/0184354 A1    Jun. 5, 2025

(51) Int. Cl.
*H04L 9/40* (2022.01)
*G06F 16/58* (2019.01)

(52) U.S. Cl.
CPC .......... *H04L 63/1483* (2013.01); *G06F 16/58* (2019.01)

(58) Field of Classification Search
CPC ................................................. H04L 63/1483
See application file for complete search history.

(56) References Cited

U.S. PATENT DOCUMENTS

| | | | |
|---|---|---|---|
| 7,114,177 B2 | 9/2006 | Rosenberg et al. | |
| 10,397,272 B1* | 8/2019 | Bruss | G06N 7/01 |
| 10,728,273 B1* | 7/2020 | Okubo | H04L 61/302 |
| 10,783,516 B2 | 9/2020 | Benkreira et al. | |
| 10,999,322 B1* | 5/2021 | Yuan | G06F 16/583 |
| 11,245,723 B2* | 2/2022 | Somerville | H04L 63/1483 |
| 11,455,364 B2* | 9/2022 | Finkelshtein | G06N 5/01 |
| 11,494,773 B2* | 11/2022 | Legault | G06F 21/50 |
| 2008/0046738 A1* | 2/2008 | Galloway | H04L 63/1416 |
| | | | 713/176 |
| 2014/0033307 A1* | 1/2014 | Schmidtler | H04L 63/1483 |
| | | | 726/22 |
| 2016/0063541 A1* | 3/2016 | Geng | G06Q 30/0277 |
| | | | 705/14.47 |
| 2018/0027013 A1* | 1/2018 | Wright | H04L 61/4511 |
| | | | 726/23 |
| 2018/0198796 A1* | 7/2018 | Chien | H04L 63/101 |

(Continued)

*Primary Examiner* — Khang Do
(74) *Attorney, Agent, or Firm* — Greenberg Traurig, LLP

(57) ABSTRACT

A method includes instructing a computing device of a user to determine when a webpage is loaded via a web browser; where the web browser includes at least one of: a plug-in or an extension associated with the provider server associated with a first entity; where the plug-in or the extension is configured to request and receive a unique schema-specific identifier from the provider server; instructing the computing device to determine that the webpage is a particular webpage based on a determination that the webpage includes at least one field to be populated with user information; determining that the particular webpage is associated with a look-alike domain name based on: comparing a domain name of the particular webpage with at least one domain name of at least one second entity associated with at least one previously used unique schema-specific identifier associated with the user or at least one other user.

20 Claims, 9 Drawing Sheets

(56) References Cited

U.S. PATENT DOCUMENTS

| | | | | |
|---|---|---|---|---|
| 2019/0268373 | A1* | 8/2019 | Celik | G06V 30/418 |
| 2019/0318343 | A1* | 10/2019 | Benkreira | G06Q 20/351 |
| 2020/0099716 | A1* | 3/2020 | Sjouwerman | H04L 63/1466 |
| 2020/0159925 | A1* | 5/2020 | Parlak | G06F 21/53 |
| 2020/0287913 | A1* | 9/2020 | Buck | H04L 63/14 |
| 2021/0256503 | A1* | 8/2021 | Nguyen | G06Q 20/40145 |
| 2021/0397669 | A1* | 12/2021 | Finkelshtein | G06F 21/566 |
| 2022/0174092 | A1 | 6/2022 | Farjon et al. | |
| 2022/0253855 | A1* | 8/2022 | Brown | G06Q 20/4014 |
| 2022/0263843 | A1* | 8/2022 | Aslam | H04L 61/4511 |
| 2022/0337625 | A1* | 10/2022 | Singh | G06N 3/04 |
| 2022/0394060 | A1* | 12/2022 | Berger | G06F 8/38 |
| 2023/0006976 | A1* | 1/2023 | Jakobsson | H04L 9/50 |
| 2023/0083949 | A1* | 3/2023 | Mutolo | H04L 63/14 726/23 |
| 2023/0086556 | A1* | 3/2023 | Himler | H04L 63/1441 726/23 |
| 2023/0224326 | A1* | 7/2023 | Horesh | H04L 63/1416 726/23 |
| 2023/0291764 | A1* | 9/2023 | Schmauch | H04L 63/1416 |
| 2023/0319108 | A1* | 10/2023 | Gechman | G06N 3/045 726/22 |
| 2023/0328034 | A1* | 10/2023 | Behera | H04L 63/1408 726/22 |
| 2024/0064170 | A1* | 2/2024 | Vajipayajula | H04L 63/1483 |
| 2024/0283820 | A1* | 8/2024 | Kochman | G06N 3/045 |
| 2024/0311473 | A1* | 9/2024 | Cirlig | H04L 63/0272 |
| 2024/0333730 | A1* | 10/2024 | Wang | H04L 63/1416 |
| 2024/0340313 | A1* | 10/2024 | Guez | G06V 30/18143 |
| 2024/0388443 | A1* | 11/2024 | Zemla | H04L 9/0891 |
| 2024/0406211 | A1* | 12/2024 | Block | H04L 63/205 |
| 2024/0414199 | A1* | 12/2024 | Diffloth | H04L 63/1425 |
| 2024/0422190 | A1* | 12/2024 | Parinov | H04L 63/1416 |
| 2025/0119452 | A1* | 4/2025 | Mon | H04L 63/1483 |

\* cited by examiner https://www.myfakesite.com/checkout/onepage/ ← 210

```
<input type="tel" autocomplete="off" autocorrect="off" autocapitalize="none" spellcheck="false"
class="number" name="data-braintree-name" name="credit-card-number" id="credit-
card-number" maxlength="22" placeholder="0000 0000 0000 0000">
```

```
<input autocomplete="cc-number" id="number" name="number" type="tel" aria-
describedby="error-for-number tooltip-for-number" data-current-field="number" class="input-
placeholder-color--lvl-34" placeholder="Card number" style="color: rgb(51, 51, 51); font-
family: "Helvetica Neue", sans-serif; padding: 0.94em 0.8em; transition: padding 0.2s
ease-out;">
```

FIG. 3 https://store.myfakesite/checkout.php ← 400

← 410

```
<input class="Textbox Field250" type="text" name="AuthorizeNet_ccno"
id="AuthorizeNet_ccno" value="" size="30">
```

FIG. 4

COMPUTER-BASED SYSTEMS FOR DETERMINING A LOOK-ALIKE DOMAIN NAMES IN WEBPAGES AND METHODS OF USE THEREOF

TECHNICAL FIELD

The present disclosure generally relates to computer-based methods and systems for determining look-alike domain names in webpages.

BACKGROUND

When a user navigates to a webpage on the Internet to purchase an item, the user will be directed to a checkout webpage. Traditionally, the user then manually enters the user's information (e.g., name, address, etc.) into fields on the particular webpage. If the user then navigates to another webpage to purchase another item, the user will then be directed to a different webpage where the user will manually enter the user's information again.

More recently, the user's information may be saved after the user enters and submits the information a first time. This information may then be automatically populated into a particular webpage such that the user does not have to manually enter the information.

SUMMARY

In some embodiments, the present disclosure provides an exemplary technically improved computer-based method that includes at least the following steps of instructing, by at least one processor of a provider server, a computing device of a user to determine when a webpage is loaded via a web browser; where the web browser includes at least one of: a plug-in associated with the provider server or an extension associated with the provider server; where the provider server is associated with a first entity; where the plug-in or the extension is configured to request and receive a unique schema-specific identifier from the provider server; where the unique schema-specific identifier is associated with a user profile of the user; where the user profile is associated with the first entity; instructing, by the at least one processor, the computing device of the user to determine, via the at least one of plug-in or extension, that the webpage is a particular webpage configured to accept a particular information based on a determination that the webpage includes at least one webpage field to be populated with user particular information; determining, by the at least one processor, that the particular webpage is associated with a look-alike domain name based on at least one of: comparing a domain name of the particular webpage with at least one domain name of at least one second entity associated with at least one previously used unique schema-specific identifier associated with the user or at least one other user, or comparing the domain name of the particular webpage with at least one domain name of at least one third entity with at least one activity performed by the user or the at least one other user; performing, by the at least one processor, at least one action of: preventing the web browser from populating the at least one webpage field; preventing a generation of the unique schema-specific identifier; preventing a transmission of the unique schema-specific identifier to the at least one of the plug-in or the extension.

In some embodiments, the present disclosure provides an exemplary technically improved computer-based system that includes a computing device of a provider server configured to execute software instructions that cause the computing device to at least: instruct a computing device of a user to determine when a webpage is loaded via a web browser; where the web browser includes at least one of: a plug-in associated with the provider server or an extension associated with the provider server; where the provider server is associated with a first entity; where the plug-in or the extension is configured to request and receive a unique schema-specific identifier from the provider server; where the unique schema-specific identifier is associated with a user profile of the user, where the user profile is associated with the first entity; instruct the computing device of the user to determine, via the at least one of plug-in or extension, that the webpage is a particular webpage configured to accept particular information based on a determination that the webpage includes at least one webpage field to be populated with user particular information; determine that the particular webpage is associated with a look-alike domain name based on at least one of: comparing a domain name of the particular webpage with at least one domain name of at least one second entity associated with at least one previously used unique schema-specific identifier associated with the user or at least one other user, or comparing the domain name of the particular webpage with at least one domain name of at least one third entity with at least one activity performed by the user or the at least one other user; perform at least one action of: preventing the web browser from populating the at least one webpage field; preventing a generation of the unique schema-specific identifier; preventing a transmission of the unique schema-specific identifier to the at least one of the plug-in or the extension.

In some embodiments, the present disclosure provides an exemplary technically improved computer-based method that includes at least the following steps of instructing, by at least one processor of a provider server, a computing device of a user to determine when a user interface is loaded via an application; where the application is configured to request and receive a unique schema-specific identifier from the provider server; where the unique schema-specific identifier is associated with a user profile of the user; where the user profile is associated with a first entity; instructing, by the at least one processor, the computing device of the user to determine that the user interface is configured to accept particular information based on a determination that the user interface includes at least one field to be populated with user particular information; determining, by the at least one processor, that the application is a look-alike application based on at least one of: comparing the application to at least one legitimate application of at least one second entity associated with at least one previously used unique schema-specific identifier associated with the user or at least one other user, or comparing the application to at least one legitimate application of at least one third entity associated with at least one activity performed by the user or the at least one other user; performing, by the at least one processor, at least one action of: preventing the application from populating the at least one field; preventing a generation of the unique schema-specific identifier; preventing a transmission of the unique schema-specific identifier to the application.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 is a diagram illustrating an example uniform resource locator (URL) and a corresponding document object model (DOM), according to one or more embodiments of the present disclosure.

FIG. 3 is a diagram illustrating another example DOM, according to one or more embodiments of the present disclosure.

FIG. 4 is a diagram illustrating another example URL and a corresponding DOM, according to one or more embodiments of the present disclosure.

DETAILED DESCRIPTION

Figure 1:
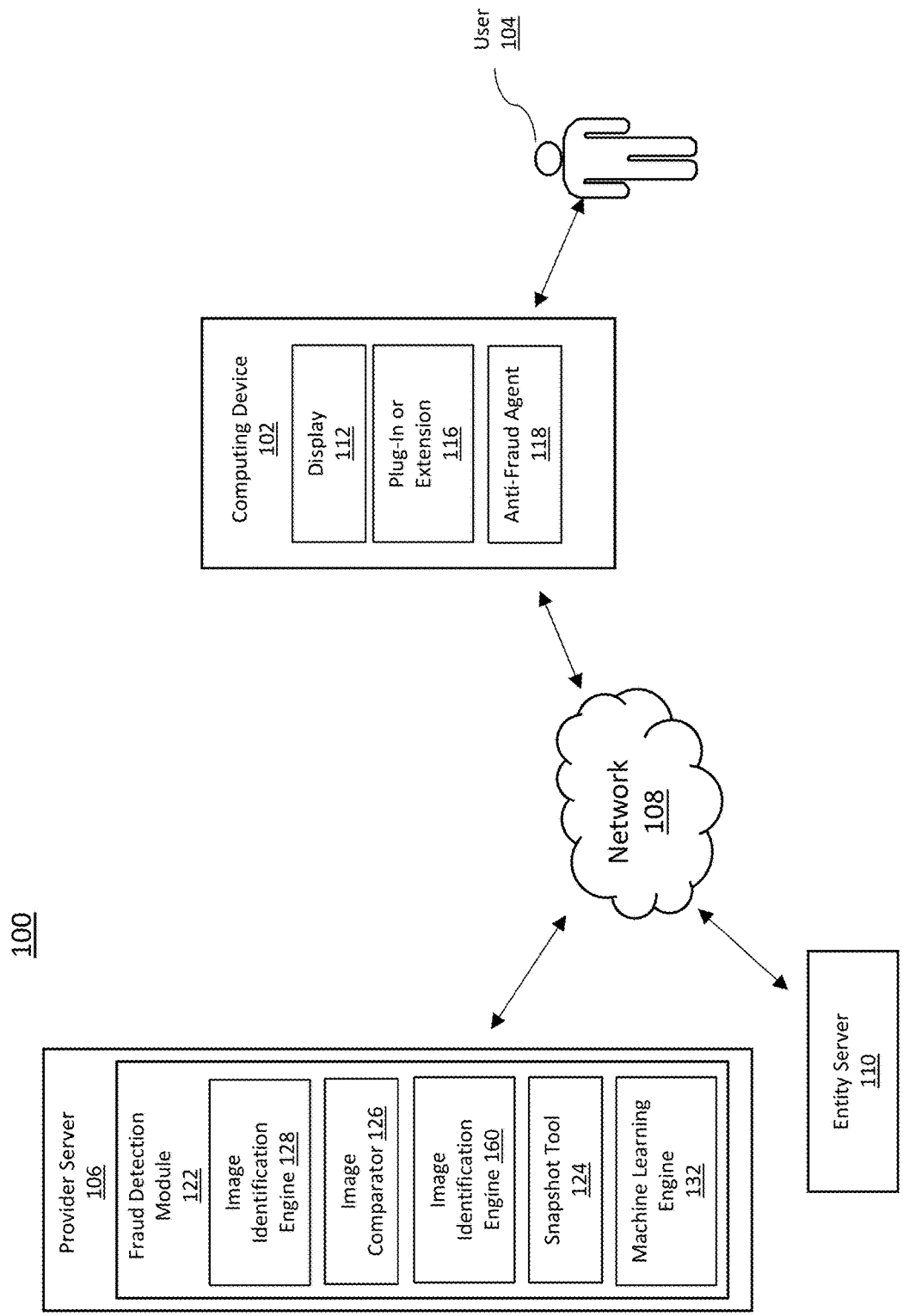
FIG. 1 is a block diagram illustrating an exemplary computer-based system for determining look-alike domain names in webpages, according to one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

As used herein, the term "customer", "client" or "user" shall have a meaning of at least one customer or at least one user respectively.

As used herein, the term "mobile computing device", "user device" or the like, may refer to any portable electronic device that may include relevant software and hardware. For example, a "mobile computing device" can include, but is not limited to, any electronic computing device that is able to among other things receive and process alerts from a customer or a financial entity including, but not limited to, a mobile phone, smart phone, or any other reasonable mobile electronic device that may or may not be enabled with a software application (App) from the customer's financial entity.

In some embodiments, a "mobile computing device" or "user device" may include computing devices that typically connect using a wireless communications medium such as cell phones, smart phones, tablets, laptops, computers, pagers, radio frequency (RF) devices, infrared (IR) devices, CBs, integrated devices combining one or more of the preceding devices, or virtually any mobile computing device that may use an application, software or functionality to receive and process alerts, credit offers, credit requests, and credit terms from a customer or financial institution.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

As used herein, in at least some embodiments, the term "field" should be understood to refer to any user interface element designed for populating data (e.g., user entering data, computing device automatically inserting data, etc.).

Various online services are available over the Internet. An example of an online service include online shopping, where a user selects items on a webpage to purchase. Generally speaking, an online service may be accessed with appropriate credentials, such as a user identifier (e.g., username, email address, mobile phone number) and a password. An end user may obtain credentials upon creation of an online profile with the online service. The online service may maintain a website that serves a webpage for entering credentials, which is referred to as a "login webpage." Additionally, the online service may maintain a particular website that serves as a webpage for entering particular (e.g., payment) information, which is referred to as a "checkout webpage."

The convenience provided by online services not only attracts legitimate end users but fraudsters as well. Fraudsters may gain access to an online profile of a victim using a variety of techniques including by phishing. Phishing is a cyber-attack that involves some form of misrepresentation. A fraudster may operate a malicious website or hijack a legitimate website to serve a phishing (i.e., look-alike) login/checkout webpage, which is a webpage that mimics the look and feel of a legitimate webpage for the purpose of stealing the victim's credentials. The fraudster may direct the victim to the phishing (i.e., look-alike) login/checkout webpage by spam email, man-in-the-middle attack, etc. The phishing (i.e., look-alike) login/checkout webpage is made to look convincingly real to trick the victim into entering his credentials.

Current anti-phishing technologies generally focus on structural level checking. Such structural level checking may involve analysis of a mail header, body content, html layout or a combination of them. However, such structural level checking may be thwarted by hackers.

In particular, noise may be added to the phishing email or phishing website so as to hinder or obstruct the structural level checking. In one example of noise addition, cousin or "look-alike" domain names may be utilized which may be difficult to distinguish from the legitimate domain name (e.g., legitimattewebsite.com instead of legitimatewebsite.com). As another example, hidden useless html elements may be inserted. As a further example, a mixture of images and text may be used to construct meaningful sentences when viewed by the user.

Unique schema-specific identifiers (e.g., virtual card numbers (VCNs)) are often used by financial institutions as a way to prevent fraudulent activity when completing activities (e.g., transactions). unique schema-specific identifiers are a limited-use codes tied to a user's existing credit card profile (e.g., account) associated with the financial institution. Users can request a one-time virtual credit card number from the financial institution to use for online purchases. Users can use their credit card accounts associated with the financial institution to create multiple unique schema-specific identifiers, which transact normally and work just like regular credit cards except that the customer can control the merchants at which unique schema-specific identifiers can be used. However, even using unique schema-specific identifiers can provide malicious actors with opportunities for phishing or whaling attacks using look-alike webpages.

FIGS. 1 through 10 illustrate systems and methods for detecting a look-alike domain name in particular webpages (e.g., checkout webpages) that use a browser plugin or extension. In some embodiments, the browser extension is configured to recognize username/password fields or particular (e.g., payment) information fields on a webpage. In some embodiments, detection of a look-alike domain name is conducted prior to the browser extension requesting a virtual card number for insertion into a payment field. The following embodiments provide technical solutions and technical improvements that overcome technical problems, drawbacks and/or deficiencies in the technical fields involving the detection of fraudulent domain names and webpages used for (e.g., phishing, whaling) attacks. As explained in more detail, below, the present disclosure provides technically advantageous computer architecture that improves the security of user payment information when generating unique schema-specific identifiers and/or automatically populating checkout webpages. In some embodiments, the system and methods are technologically improved by being programmed with machine-learning to identify look-alike domain names and/or webpages that are indicators of fraudulent activity. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram illustration of an exemplary system 100 used to implement one or more embodiments of the present disclosure. The components and arrangements shown in FIG. 1 are not intended to limit the disclosed embodiments as the components used to implement the disclosed processes and features may vary. In accordance with disclosed implementations, the system 100 may include an entity server 110 in communication with a computing device 102 associated with a user 104 via a network 108. In some embodiments, the system 100 also includes a provider server 106 in communication with the computing device 102 via the network 108.

Network 108 may be of any suitable type, including individual connections via the internet such as cellular or Wi-Fi networks. In some embodiments, network 108 may connect participating devices using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

In some embodiments, entity server 110 may be associated with a first entity. In some embodiments, the first entity may be a merchant. For example, server 110 may manage individual user profiles (e.g., accounts) or process transactions. In some embodiments, the server 110 may include one or more logically or physically distinct systems.

In some embodiments, provider server 106 may be associated with a second entity. In some embodiments, the second entity may be a financial institution. For example, provider server 106 may manage individual user profiles or process transactions.

In some embodiments, the provider server 106 may include one or more logically or physically distinct systems. As further described herein, the provider server 106 may perform operations (or methods, functions, processes, etc.) that may require access to one or more peripherals and/or modules. In the example of FIG. 1, the provider server 106 includes a fraud detection module 122.

In some embodiments, each of the entity server 110 and the provider server 106 may include hardware components such as a processor (not shown), which may execute instructions that may reside in local memory and/or transmitted remotely. In some embodiments, the processor may include any type of data processing capacity, such as a hardware logic circuit, for example, an application specific integrated circuit (ASIC) and a programmable logic, or such as a computing device, for example a microcomputer or microcontroller that includes a programmable microprocessor.

In some embodiments, the computing device 102 may be associated with the user 104. In some embodiments, the computing device 102 may generally include at least computer-readable non-transient medium, a processing component, an Input/Output (I/O) subsystem and wireless circuitry. In some embodiments, these components may be coupled by one or more communication buses or signal lines. In some embodiments, the computing device 102 may include a microprocessor, a memory, a contactless communication interface having a communication field and the display 112. The computing device 102 may also include means for receiving user input, such as a keypad, touch screen, voice command recognition, a stylus, and other input/output devices, and the display 112 may be any type of display screen, including an LCD or LED display. In some embodiments, the computing device 102 may be, without limitations, a desktop computer, a laptop computer, a tablet, a mobile phone or portable device, or any other computing hardware. In some embodiments, the computing device 102 includes a user interface 136.

In some embodiments, the computing device 102 may be configured to execute software instructions for performing one or more operations consistent with the disclosed embodiments. In some embodiments, the computing device 102 may be a mobile device (e.g., tablet, smartphone, etc.), a desktop computer, a laptop, a server, a wearable device (eyeglasses, a watch, etc.), and/or dedicated hardware device. In some embodiments, the computing device 102 may include one or more processors configured to execute software instructions stored in memory, such as memory included in computing device 102. In some embodiments, the computing device 102 may include software that, when executed by a processor, performs known Internet-related communication and content display processes. For instance, in some embodiments, the computing device 102 may execute browser software that generates and displays interface screens including content on a display device included in, or connected to, the computing device 102. The disclosed embodiments are not limited to any particular configuration of the computing device 102. For instance, the computing device 102 may be a mobile device that stores and executes mobile applications that provide financial-service-related functions offered by a financial service provider, such as an application associated with one or more user profiles that a user holds with a financial service provider.

In some embodiments, the computing device 102 may have data connectivity to a network, such as the Internet, via a wireless communication network, a cellular network, a wide area network, a local area network, a wireless personal area network, a wide body area network, or the like, or any combination thereof. In some embodiments, through this connectivity, the computing device 102 may communicate with the merchant server 110 and the provider server 106.

In some embodiments, the computing device 102 may display a webpage generated/provided by the entity server 110 on the display 112. In some embodiments, the webpage may be one that the user 104 and the computing device 102 have visited before. In other embodiments, the webpage may be one that the user 104 and the computing device 102 have not visited before.

In some embodiments, as discussed above, the computing device 102 may include an application such as a financial application 134 (or application software) which may include program code (or a set of instructions) that performs various operations (or methods, functions, processes, etc.), as further described herein.

In some embodiments, the webpage displays one or more items which the user 104 may select to purchase. In some embodiments, once the items or services have been selected, the entity server 110 may then display a particular (e.g., checkout) webpage to the user 104 and the computing device 102. In some embodiments, the checkout webpage may include a plurality of fields to be populated/filled-in with the user's information to complete the transaction. In some embodiments, the user information may include, for example, the user's name, billing address (e.g., name, address, city, state, zip code), credit card number, credit card expiration date, credit card verification value (CCV) number, etc.

In some embodiments, the computing device 102 may also communicate, through the network 108, with the provider server (also referred to as a backend server) 106. In some embodiments, the provider server 106 may be associated with a financial institution. In some embodiments, the provider server 106 (or, alternatively, a third party server) may provide the computing device 102 with a plug-in or extension 116. In some embodiments, the plug-in or extension 116 may (e.g., automatically) determine that the user 104 and computing device 102 have reached the checkout webpage without using site-specific rules, as described in greater detail below.

In some embodiments, the plug-in or extension 116 may perform a check to determine whether or not the webpage is a look-alike webpage, as will be described in further detail below. In response to the look-alike webpage check, in some embodiments, the plug-in or extension 116 may request a virtual token from the provider server 106, which may generate the virtual token and transmit the virtual token to the user device 102 (e.g., to the plug-in or extension 116). In some embodiments, the plug-in or extension 116 may then automatically populate some or all of the fields on the checkout webpage with the information in the virtual token to facilitate the checkout process. In some embodiments, as explained in more detail below, the virtual token may be or include a (e.g., new) virtual credit card number that corresponds to a pre-existing credit card profile of the user 104. In some embodiments, the virtual token may also or instead include the user's name, billing address, expiration date for the virtual credit card number, CCV for the virtual credit card number, bank account number, routing number, etc.

FIG. 2 is a diagram illustrating an example uniform resource locator (URL) 200 and a corresponding document object model (DOM) 210, consistent with certain disclosed embodiments. The URL 200 and/or the DOM 210 may include one or more elements that may indicate that the URL 200 and the DOM 210 are linked to a checkout webpage. More particularly, the elements may be text, words, attributes, tags, field names, naming patterns, styles, numbers, and/or other identifiers that the plug-in or extension 116 recognizes are likely associated with checkout webpages, or otherwise with pages in which the fields may be populated.

In one embodiment, the term "checkout" in the URL 200 may be examples of one such element, and the plug-in or extension 116 may determine that the URL 200 is linked to a checkout webpage in response to identifying this element. In response, the plug-in or extension 116 may search for one or more of the fields that need to be populated with the user's information.

In another embodiment, the element may be a signature of a merchant in the URL 200 or DOM 210 that indicates to the plug-in or extension 116 that the merchant has either built or hosts the webpage linked to the URL 200. For example, the term "onepage" in the URL 200 may be an element, and the plug-in or extension 116 may determine that a third-party tool was used to generate the checkout portion of the DOM 210 in response to this element. In response, the plug-in or extension 116 may search for one or more of the fields that need to be populated with the user's information based at least partially upon one or more other naming patterns of the third-party tool. For example, other naming patterns may be or include a name attribute ending in "_ccno", an attribute called "data-braintree-name" with a value of "number", and id attribute that begins with "recurly", etc.

In another embodiment, a placeholder in the DOM 210 showing a sequence of (e.g., 16-digit) numbers in a format associated with a payment profile (e.g., a credit card number) may be an element, and the plug-in or extension 116 may determine that the DOM 210 is linked to a checkout webpage in response to identifying this element. In response, the plug-in or extension 116 may search for one or more of the fields that need to be populated with the user's information.

In another embodiment, a data-braintree-name of "number" in the DOM 210 may be an element, and the plug-in or extension 116 may determine that the DOM 210 is linked to a checkout webpage in response to identifying this element. More particularly, this may indicate that a third-party tool, such as the BRAINTREE® tool, is being used and tagging this as one or more of the fields that need to be populated with the user's information.

In another embodiment, a name and/or id of "credit-card-number" in the DOM 210 may be an element, and the plug-in or extension 116 may determine that the DOM 210 is linked to a checkout webpage in response to identifying this element. More particularly, this may be a custom way that one or more of the fields have been tagged.

FIG. 3 is a diagram illustrating another example DOM 310, consistent with certain disclosed embodiments. The DOM 310 may include one or more elements that may indicate that the DOM 310 is linked to a checkout webpage. In this example, the webpage is determined to be a checkout webpage without analyzing the URL.

In one embodiment, an autocomplete field and/or tag of "cc-number" in the DOM 310 may be an element, and the plug-in or extension 116 may determine that the DOM 310 is linked to a checkout webpage in response to identifying this element. More particularly, this website tag is an example of an element that server 110 can use to inform autocompletion tools that this is a credit card number. The autocomplete tag is one example of server 110 intentionally informing autocompletion tools, including the plug-in or extension 116, that data can be automatically supplied, but any tags used by server 110 for this purpose could also be applied.

In another embodiment, a placeholder of "card number" in the DOM 310 may be an element, and the plug-in or extension 116 may determine that the DOM 310 is linked to a checkout webpage in response to identifying this element. More particularly, this may be an indication that the server 110 or website creator is indicating to the user 104 that the user 104 should enter his/her credit card number here. This information may be used in conjunction with other elements to confirm that this is a credit card field.

FIG. 4 is a diagram illustrating yet another example URL 400 and a corresponding DOM 410, consistent with certain disclosed embodiments. The URL 400 and/or the DOM 410 may include one or more elements that may indicate that the URL 400 and the DOM 410 are linked to a checkout webpage.

In one embodiment, the term "checkout.php" in the URL 400 may be an element, and the plug-in or extension 116 may determine that the URL 400 is linked to a checkout webpage in response to identifying this element. In another embodiment, a name and/or id in the DOM 410 ending in "_ccno" may be an element, and the plug-in or extension 116 may determine that the DOM 410 is linked to a checkout webpage in response to identifying this element.

Referring back to FIG. 1, in some embodiments, the computing device 102 may be configured to execute an anti-fraud agent 118 for determining if the checkout webpage has a look-alike domain. In some embodiments, the checkout webpage to be checked may be sent in a fraud detection query by the anti-fraud agent 118 to the fraud detection module 122 at the provider server 106.

As shown in FIG. 1, in some embodiments, the provider server 106 may be configured to execute the fraud detection module 122 which receives the webpage from the anti-fraud agent 118. In some embodiments, the fraud detection module 122 may extract, for example, the webpage domain name, all URL links directly from the webpage content and/or further extract domains from those URLs.

In some embodiments, the fraud detection module 122 may be implemented as an application (or set of instructions) or software/hardware combination configured to perform operations for identifying look-alike domain names in checkout webpages. In some embodiments, the fraud detection module 122 may utilize data and characteristics of the checkout webpage such as, but not limited to, webpage domain name, webpage URLS, webpage logos/banners, etc. to determine if the checkout webpage is a look-alike checkout webpage.

In some embodiments, the fraud detection module 122 may be configured to extract the webpage domain name directly from the webpage content. In some embodiments, the fraud detection module 122 may be configured to compare the webpage domain name against domain names of merchants with which the user 104 has already generated a unique schema-specific identifier. In some embodiments, the fraud detection module 122 may be in communication with activity (e.g., transaction) database(s) of the financial institution for providing information for identifying characteristics related to entities (i.e., merchants) associated with previous transactions. In some embodiments, the transaction database(s) may include historical transaction data entries. The historical transaction data entries may include data related to past transactions completed by the user 104 and a plurality of other users. In some embodiments, the transaction database(s) may store data related to past merchants associated with the user 104. In some embodiments, the transaction database(s) may store previously used unique schema-specific identifiers that are associated with the user 104. In some embodiments, the transaction database(s) may store previously used unique schema-specific identifiers that are associated with merchants associated with the user 104. In some embodiments, the transaction database(s) may store all previous transactions performed by the user 104, and their associated merchants. Thus, the domain name extracted from the checkout webpage may be compared to any known domain information and/or other merchant information associated with the user and/or with the financial institution. In some embodiments, the fraud detection module 122 may use similarity scores and/or techniques from autocorrect to determine if the checkout webpage domain name matches a domain name of an authentic merchant. In some embodiments, the fraud detection module 122 is configured to determine whether the checkout webpage is a fraudulent webpage based on this comparison.

In some embodiments, the fraud detection module 122 may be configured to utilize one or more machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments, the fraud detection module 122 includes a machine learning engine 132. In some embodiments, the machine learning engine 132 may employ the Artificial Intelligence (AI)/machine learning techniques to determine whether a checkout webpage is a fraudulent webpage associated with a look-alike domain name, as will be described in further detail below.

In some embodiments, the fraud detection module 122 may be configured to authenticate a checkout webpage by recognizing logos within the checkout webpage and comparing the checkout webpage logos to logos of authentic domains. In some embodiments, the fraud detection module 122 may capture the checkout webpage using, for example, a snapshot tool 124. In some embodiments, the fraud detection module 122 may include an image comparator 126. In some embodiments, the image comparator 126 may be configured to compare the image of the checkout webpage against images of logos and banners associated with authentic domain names. In some embodiments, the checkout webpage logos may be compared to, for example, an official logo/banner database to identify a matching logo/banner image from the database.

In some embodiments, the fraud detection module 122 may include an image identification engine 128. In some embodiments, the image identification engine 160 may be implemented as an application (or set of instructions) or software/hardware combination configured to perform operations (or methods, functions, processes, etc.) for processing and recognizing data of, without limitation, one or more objects, subjects, or both, present in an visual input (e.g., image, video file, etc.). In some embodiments, the image identification engine 128 may use one or more computer visual recognition techniques and/or algorithms to recognize at least one data object, subject, or both, or other identifier present in the checkout webpage image taken of the checkout webpage. Such computer visual recognition techniques used by the image identification engine 128 may use the output of one or more digital image processing operations performed by the fraud detection module 122. In some embodiments, the computer visual recognition techniques may include performing at least one computer visual recognition task such as, for example, without limitation, object recognition (e.g., object classification to classify one or more data objects found within the image), object identification to identify individual instances of objects (e.g., identifying one or more data objects present in the image), and/or processing the image data to detect at least one specific condition (e.g., a particular activity engaged into by identified subject(s)). Examples of data objects that may be visible in an image may include, for example, merchants' logos, banners, etc.

Figure 5:
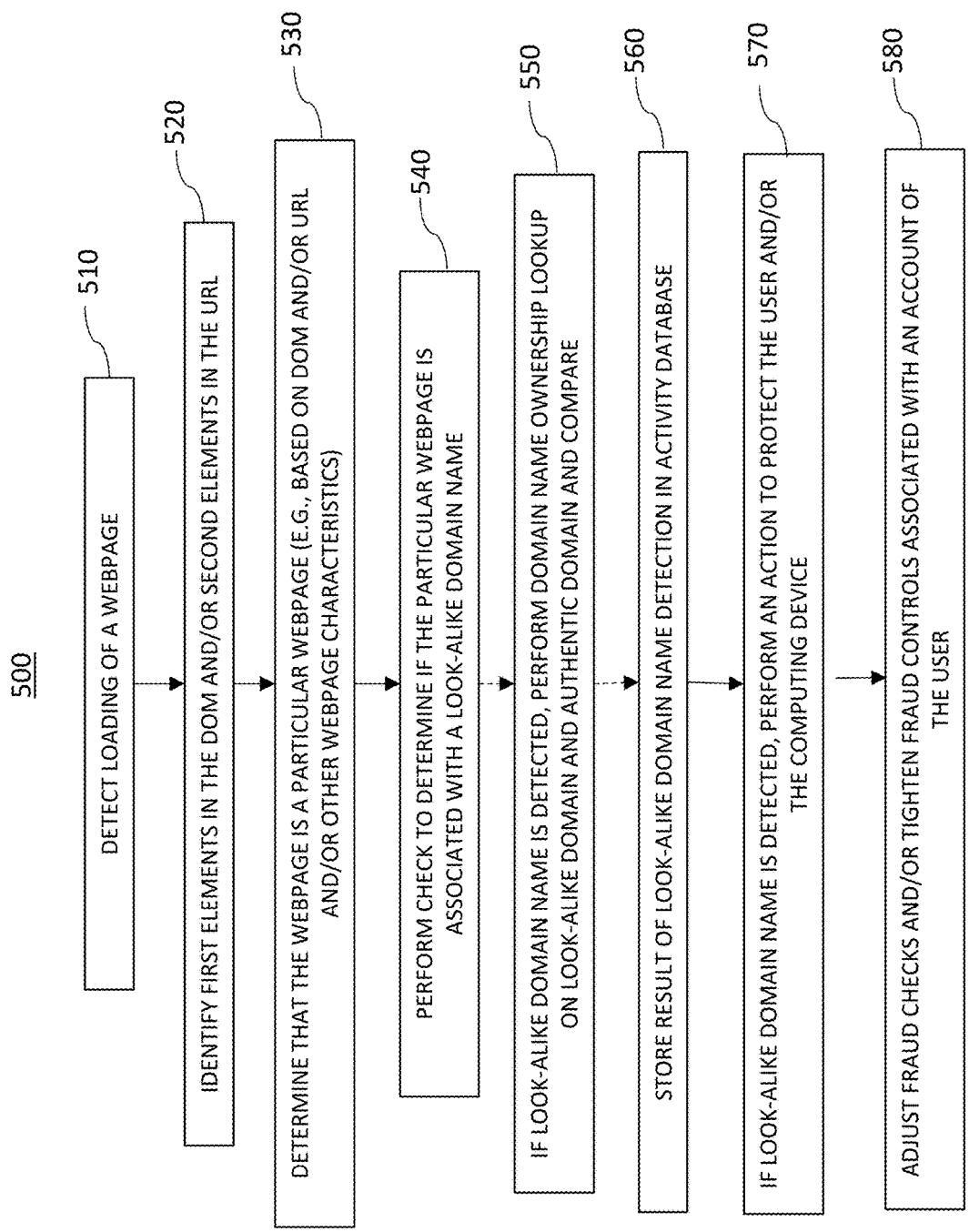
FIG. 5 is a process flow diagram illustrating an example of a computer-based process for determining look-alike domain names in webpages, according to one or more embodiments of the present disclosure.

FIG. 5 is a process flow diagram illustration an example of an illustrative computer-mediated process 500 for recognizing a look-alike checkout webpage, according to one or more embodiments of the present disclosure. The exemplary computer-mediated process 500 may be executed by software, hardware or a combination thereof. For example, process 500 may be performed by including one or more components described in the system 100 of FIG. 1 (e.g., computing device 102, provider server 106 and entity server 110).

At 510, the exemplary computer-based system 100 may detect a loading of a webpage via a web browser. In some embodiments, the checkout webpage may be generated/provided by the merchant server 110 (e.g., via the network 108) and loaded by the computing device 102 e.g., executing the web browser with the plug-in or extension 116. In some embodiments, the webpage may include or otherwise be associated with a URL and a DOM.

At 520, the computing device 102, executing the plug-in or extension 116, may analyze/search the DOM to identify one or more first elements in the DOM. In some embodiments, the plug-in or extension 116 may also or instead analyze/search the URL to identify one or more second elements in the URL. In some embodiments, the analysis may include searching through the input fields in the DOM and/or URL to look for certain tags, attributes, names, styles, naming patterns, placeholders, text, numbers, etc. Examples of elements in the DOM and the URL are provided in FIGS. 2-4 and the corresponding description above. In some embodiments, the one or more first elements and/or the one or more second elements may also or instead be tied to any other tag, attribute, etc. on the webpage (e.g., a CCV field) that would increase a confidence that the webpage is a checkout webpage.

At 530, the computing device 102, executing the plug-in or extension 116, may determine that the webpage is configured to accept payments and/or payment information (i.e., that the webpage is a checkout webpage). In some embodiments, the determination that the webpage is configured to accept payments and/or payment information may include determining that the webpage includes an profile number field, which may include one or more fields that are configured to be populated/filled-in with the user's payment information, such as the user's name, billing address, credit card number expiration date for the credit card number, CCV for the credit card number, bank account number, routing number, etc.

In some embodiments, the determination may be based upon identification of the one or more first elements in the DOM and/or the one or more second elements in the URL. In some embodiments, the DOM may change or otherwise mutate as the webpage becomes the checkout webpage, and the one or more first elements in the DOM may be analyzed/identified before, during, or after the change/mutation to determine that the webpage is configured to accept payments.

In some embodiments, the one or more first elements identified in the DOM may be a primary indicator that the webpage is configured to accept payments, and the one or more second elements identified in the URL may be a secondary indicator that the webpage is configured to accept payments. In some embodiments, the secondary indicator may be used to boost a confidence/likelihood (e.g., score) that the webpage is configured to accept payments. For example, in some embodiments, the plug-in or extension 116 may generate a first confidence score that the webpage is configured to accept payments after identifying the one or more first elements in the DOM. In some embodiments, identifying one or more second elements in the URL may generate a second confidence score. By way of example and not limitation, a first confidence score may be 80%, and a second confidence score may be 90%.

In some embodiments, the computing device 102, executing the plug-in or extension 116, may determine that the webpage is configured to accept payments whether the plug-in or extension 116 recognizes the webpage or not. In other words, even if site-specific rules do not exist for the particular checkout webpage, the plug-in or extension 116 may still be able to determine that the webpage configured to accept payments and includes a plurality of fields that need to be populated with the user's (e.g., payment) information base at least partially upon the first elements and/or second elements.

At 540, if the webpage is determined to be a checkout webpage, the provider server 106 may perform a check to determine if the checkout webpage is associated with a look-alike domain name. In some embodiments, the provider server 106 may extract a webpage domain name from the checkout webpage and compare the checkout webpage domain name to authentic merchant domain names. In some embodiments, the provider server 106 may determine the webpage is a look-alike webpage if the domain name of the webpage is similar (but not matching) to a domain name of a merchant with which the user 104 has already generated a unique schema-specific identifier. In some embodiments, the provider server 106, may determine the webpage is a look-alike webpage if the domain name of the webpage is similar (but not matching) to a domain name with of merchants with which the user 104 has already performed transactions, as will be discussed in further detail below.

As noted above, in some embodiments, the fraud detection module 122 may be in communication with a transaction database(s) of the financial institution which stores information (e.g., domain names, merchant names, transaction history, etc.) related to entities (i.e., merchant) associated with previous transactions, unique schema-specific identifiers, etc. of the user 104 and of other users associated with the financial institution. Thus, in some embodiments, the domain name extracted from the checkout webpage may be compared to any known domain information and/or other merchant information associated with the user and/or with the financial institution. In some embodiments, the transaction database(s) may in store authentic domains and associated merchants. In some embodiments, the transaction database(s) may store look-alike domains and associated merchants. In some embodiments, the transaction database(s) may store previous unique schema-specific identifiers and associated authentic domains and/or merchants. In some embodiments, the transaction database(s) may store previous unique schema-specific identifiers and associated look-alike domains and/or merchants. In some embodiments, the fraud detection module 122 may use similarity scores and/or techniques from autocorrect to determine if the checkout webpage domain name matches a stored domain name of an authentic merchant. In some embodiments, the fraud detection module 122 is configured to determine whether the checkout webpage is a fraudulent webpage based on this comparison.

In some embodiments, the machine learning engine 132 may be employed by the fraud detection module 122 to predict if the checkout webpage is associated with a look-alike domain name. In some embodiments, the machine learning engine 132 employs a binary classification model where the output is the likelihood that YES the checkout webpage is a lookalike webpage or NO the checkout webpage is not a lookalike webpage. In some embodiments, the data input into the machine learning engine 132 may include both raw and processed data. For example, in some embodiments, raw data may include, but is not limited to, the text body of the checkout website, the domain name of the checkout website, the HTML elements of the checkout website, etc. In some embodiments, the domain name of the checkout website may be input as a single string or broken down into subdomains. In some embodiments, processed data may include the distance from the domain name to a known merchant name. For example, amazon.com versus amazn.com could be considered a difference of 1. In some embodiments, processed data may also include the number of misspellings or grammatical errors within a website, whether or not the domain name matches the name displayed on the checkout webpage body, whether the domain name matches links displayed in the checkout webpage body, and/or whether URL links in the body match between their text and their URL.

In some embodiments, the machine learning engine 132 may be trained on sets of non-malicious webpages and malicious webpages with look-alike domains so as to determine look-alike domain-identifying characteristics related to a plurality of known merchants to obtain a trained machine learning engine. In some embodiments, thousands of data sets may be fed to the machine learning engine 132 from the provider server 106 and the transaction database. The machine learning engine 132 may be trained such that predictions of look-alike websites become increasingly accurate as further data entries are provided to the provider server 106. For example, in some embodiments, the machine learning engine 132 may predict that a certain checkout website may be a look-alike webpage, based on historical data entries. However, if that checkout website is actually a legitimate checkout website, the machine learning engine 132 may be trained on the new data subsets to categorize the checkout website differently.

In some embodiments, if at least one of the checkout webpage domains matches an authentic domain name, then no fraud is detected. In some embodiments, if none of the checkout webpage domains are identified as look-alike domains, then no fraud is detected. Conversely, in some embodiments, if any one of the checkout webpage domains are outside the legitimate domain(s), then fraud is detected. In some embodiments, if at least one of the checkout webpage domains matches a look-alike domain, fraud is detected.

Optionally, at 550, if fraud is detected, the provider server 106 may perform a domain name ownership lookup to compare ownership of the checkout webpage with authentic domain ownership. For example, if the checkout webpage has a domain ownership by XYZ Co. but the authentic checkout webpage has a domain ownership by ABC Co., the provider server 106 may determine that the checkout webpage is a look-alike website. In some embodiments, the provider server 106 may search official domain registrar databases to determine domain name ownership. In some embodiments, the transaction database(s) may include domain name ownership associated with each merchant with which users have historically transacted with. In some embodiments, if the ownership of the checkout webpage look-alike domain name does not match the ownership of the authentic domain name, the previously detected fraud may be confirmed.

Optionally, at 560, the result of the look-alike domain name detection may be stored in the transaction database(s) of the provider server 106. In some embodiments, the provider server 106 may also store the results of the domain name ownership lookup. In some embodiments, the results of the domain name ownership lookup may be cached by the provider server 106. In some embodiments, where the domain name ownership is cached, the cache may be updated at regular intervals. For example, in some embodiments, the cache may be updated at hourly, or daily, or weekly or monthly intervals. In some embodiments, because domain names often change ownership, the domain name ownership stored within the cache may be searched by the provider server 106 and updated within the cache at regular intervals. For example, in some embodiments, the domain name ownership may be searched and updated at weekly, or monthly or yearly intervals. In some embodiments, domain name ownership expiration may also be stored in the cache.

At 570, if a look-alike domain name is detected, then the anti-fraud agent 118 may perform an action to protect the user 104, the computing device 102 and/or the financial institution. For example, in some embodiments, a message warning that the checkout webpage is malicious phishing/whaling content may be provided by the anti-fraud agent 118 to the user 104. In other examples, if a look-alike webpage is detected, the plug-in or extension 116 may be prevented from generating a unique schema-specific identifier and/or auto-filling the unique schema-specific identifier information within the payment fields.

In some embodiments, the provider server 106 may generate a fake unique schema-specific identifier which is not linked to the user's user profile associated with the financial entity. In some embodiments, the financial entity may, via the fake unique schema-specific identifier, track the look-alike domain and activity performed by the user at the look-alike domain.

At 580, if the user 104 proceeds to enter payment information within the checkout webpage, the provider server 106 may adjust fraud checks or tighten fraud controls associated with an profile of the user 104.

Figure 6:
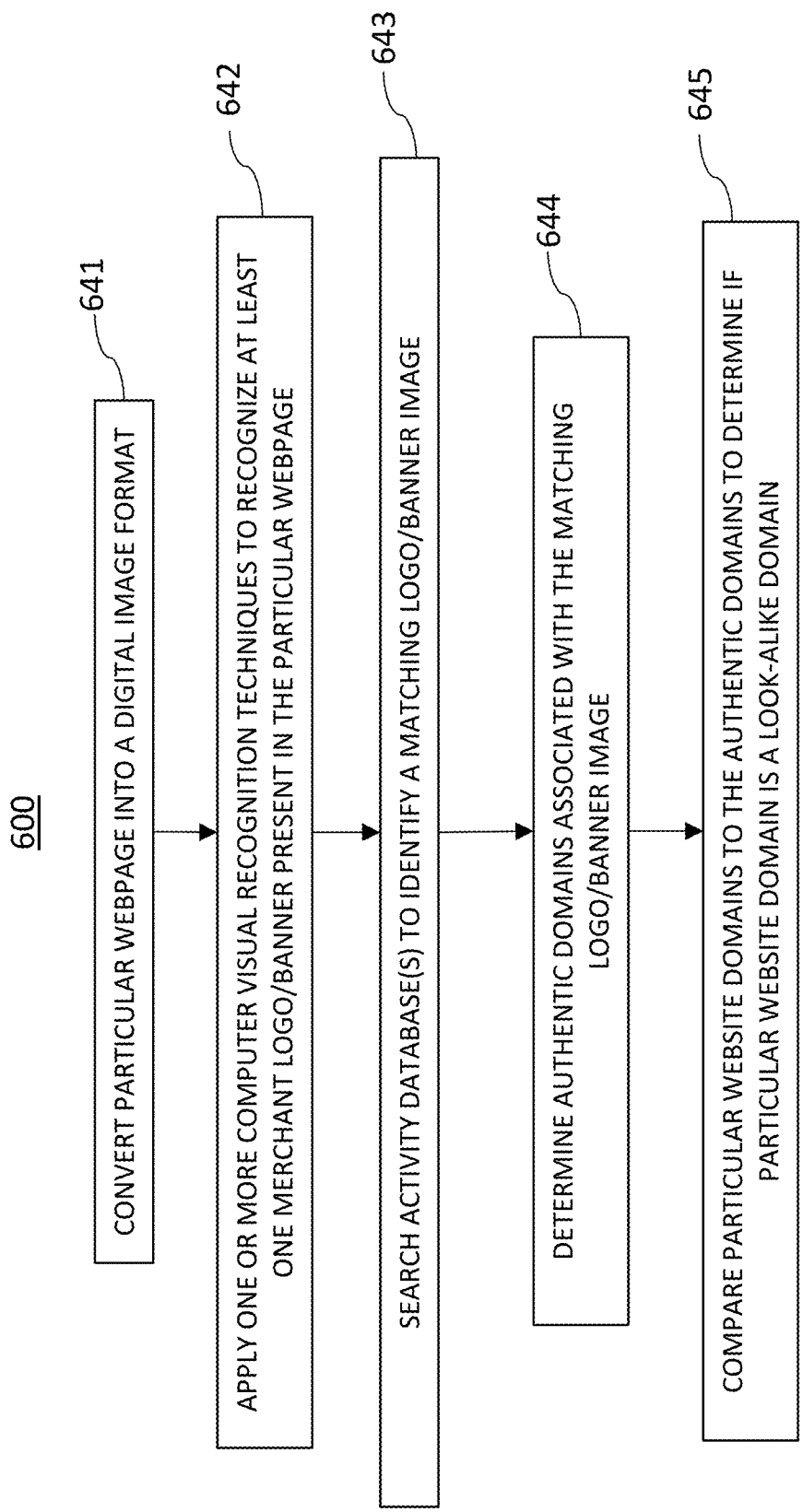
FIG. 6 is a process flow diagram illustrating an example of a computer-based process for determining look-alike domain names in webpages, according to one or more embodiments of the present disclosure.

FIG. 6 is a process flow diagram illustration an example of an illustrative computer-mediated process 600 for recognizing a look-alike checkout webpage, according to one or more embodiments of the present disclosure. The exemplary computer-mediated process 600 may be executed by software, hardware or a combination thereof. For example, process 600 may be performed by including one or more components described in the system 100 of FIG. 1 (e.g., computing device 102, provider server 106 and entity server 110).

In some embodiments, the process 600 may include the steps of as the process 500 and may further include steps in which a logo/banner analysis of the checkout webpage may be performed to further identify a look-alike webpage. In some embodiments, steps 641 to 645 may be performed at any time after step 530 in the process 500.

At step 641, the checkout webpage may be converted to an image in a digital image format. In some embodiments, the conversion may be performed, for example, using a snapshot imaging (screenshot) tool, which may be a third party tool such as from the open source PhantomJS web stack, for instance. In some embodiments, the digital image format may be a JPEG format, bitmap format, or other digital image format.

In some embodiments, because a snapshot of the whole checkout webpage is taken, the checkout webpage image may contain more area than a logo/banner. Hence, in some embodiments, the checkout webpage image will not exactly match a logo/banner image. However, the match should be sufficient to detect the presence of the logo/banner image, or a close copy of the logo/banner image, as being embedded within the checkout webpage image.

At step 642, the image identification engine 128 may use one or more computer visual recognition techniques and/or algorithms to recognize at least one data object, subject, or both, or other identifier present in the checkout webpage image taken of the checkout webpage, as discussed in further detail above. In some embodiments, the at least one data object, subject, or both, or other identifier may be, for example, a merchant logo and/or banner.

At step 643, the transaction database(s) may be searched to identify a matching logo/banner image. In some embodiments, identification of the matching logo/banner image may be performed using a sub-image matching algorithm that compares sub-images containing a logo or banner from the checkout webpage image against the logo/banner image from the transaction database(s) to find a match.

At 644, once the matching logo/banner image is found, the authentic domain(s) associated with the matching logo/banner image is (are) determined. In some embodiments, the legitimate domain(s) are associated with the official logo/banner images in the transaction database(s) and so may be obtained from the transaction database(s).

At 645, the authentic domain(s) determined from the matching logo/banner image may be compared against the checkout webpage domains extracted directly from the checkout webpage. In some embodiments, this comparison may be performed by the fraud detection module 122 at the provider server 106. In some embodiments, the result of the comparison may be used to verify the determination made at step 540.

Figure 7:
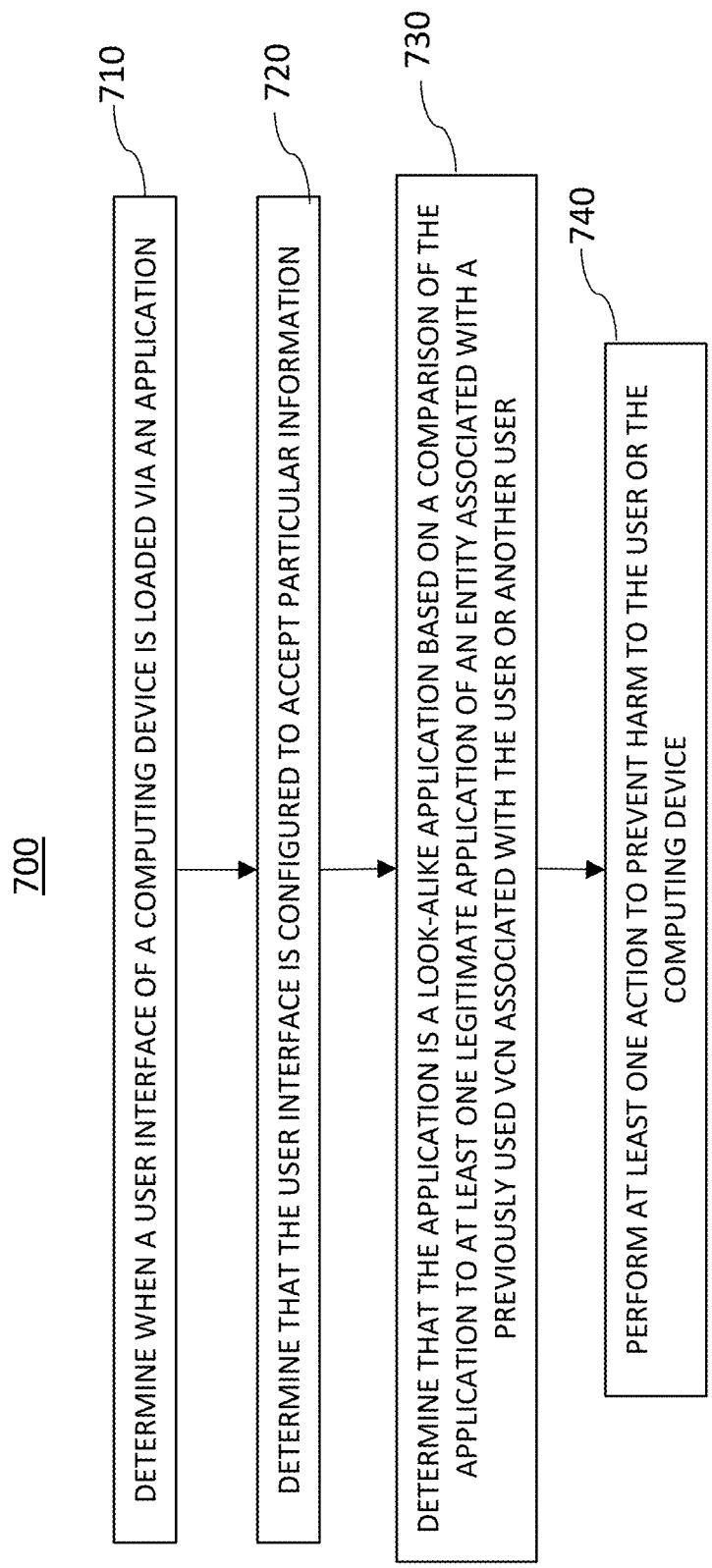
FIG. 7. is a process flow diagram illustrating an example of a computer-based process for determining look-alike applications, according to one or more embodiments of the present disclosure.

FIG. 7 is a process flow diagram illustration an example of an illustrative computer-mediated process 700 for recognizing a look-alike application, according to one or more embodiments of the present disclosure. The exemplary computer-mediated process 600 may be executed by software, hardware or a combination thereof. For example, process 600 may be performed by including one or more components described in the system 100 of FIG. 1 (e.g., computing device 102, provider server 106 and entity server 110).

At 710, the provider server 106 may instruct the computing device 102 of the user 104 to determine when the user interface 136 of the computing device 102 is loaded via the application 134. In some embodiments, the application 134 is configured to request and receive a unique schema-specific identifier from the provider server 106. In some embodiments, the unique schema-specific identifier is associated with a user profile associated with the financial institution. For example, the unique schema-specific identifier may be associated with a user credit card profile provided by the financial institution.

At 720, the provider server 106 may instruct the computing device 102 to determine that the user interface 136 is configured to accept payment information based on a determination that the user interface 136 includes at least one field to be populated with user payment information.

At 730, in some embodiments, the provider server 106 may determine that the application 134 is a look-alike application based on a comparison of the application 134 to at least one legitimate application of a merchant associated with at least one previously used unique schema-specific identifier associated with the user or at least one other user. In some embodiments, the provider server 106 may determine the application 134 is a look-alike application based on a comparison of the application 134 to at least one legitimate application of at least one merchant associated with at least one transaction performed by the user or the at least one other user.

At 740, the provider server 106 may perform at least one action to prevent harm to the user 104 or the computing device 102. For example, in some embodiments, the provider server 106 may prevent the application 134 from populating the at least one field. In some embodiments, the provider server 106 may prevent a generation of the unique schema-specific identifier. In some embodiments, the provider server 106 may prevent a transmission of the unique schema-specific identifier to the application 134.

Figure 8:
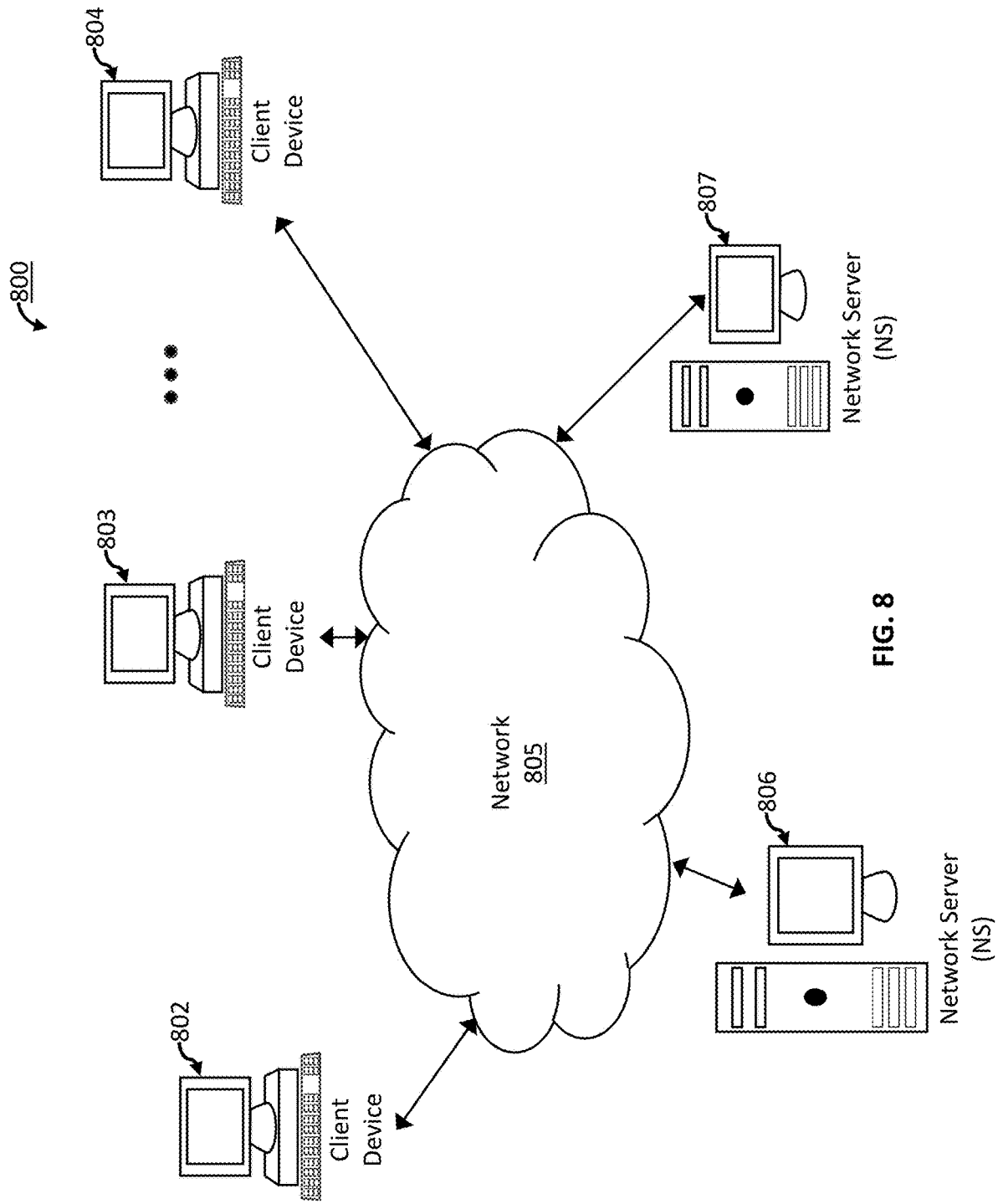
FIG. 8 is a block diagram illustrating an exemplary computer-based system and platform, according to one or more embodiments of the present disclosure.

FIG. 8 depicts a block diagram of an exemplary computer-based system and platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 800 may be configured to manage a large number of members and concurrent transactions, as detailed herein. In some embodiments, the exemplary computer-based system and platform 800 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 8, member computing device 802, member computing device 803 through member computing device 804 (e.g., clients) of the exemplary computer-based system and platform 800 may include virtually any computing device capable of receiving and sending a message over a network (e.g., cloud network), such as network 805, to and from another computing device, such as servers 806 and 807, each other, and the like. In some embodiments, the member devices 802-804 may be personal computers, multiprocessor systems, microprocessor-based or programmable consumer electronics, network PCs, and the like. In some embodiments, one or more member devices within member devices 802-804 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 802-804 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 802-804 may include may run one or more applications, such as Internet browsers, mobile applications, voice calls, video games, videoconferencing, and email, among others. In some embodiments, one or more member devices within member devices 802-804 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 802-804 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 802-804 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 805 may provide network access, data transport and/or other services to any computing device coupled to it. In some embodiments, the exemplary network 805 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 805 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 805 may include and implement, as an alternative or in conjunction with one or more of the above, a WiMAX architecture defined by the WiMAX forum. In some embodiments and, optionally, in combination of any embodiment described above or below, the exemplary network 805 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 805 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 805 may also include mass storage, such as network attached storage (NAS), a storage area network (SAN), a content delivery network (CDN) or other forms of computer or machine readable media.

In some embodiments, the exemplary server 806 or the exemplary server 807 may be a web server (or a series of servers) running a network operating system, examples of which may include but are not limited to Apache on Linux or Microsoft IIS (Internet Information Services). In some embodiments, the exemplary server 806 or the exemplary server 807 may be used for and/or provide cloud and/or network computing. Although not shown in FIG. 8, in some embodiments, the exemplary server 806 or the exemplary server 807 may have connections to external systems like email, SMS messaging, text messaging, ad content providers, etc. Any of the features of the exemplary server 806 may be also implemented in the exemplary server 807 and vice versa.

In some embodiments, one or more of the exemplary servers 806 and 807 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 801-804.

In some embodiments and, optionally, in combination of any embodiment described above or below, for example, one or more exemplary computing member devices 802-804, the exemplary server 806, and/or the exemplary server 807 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 9:
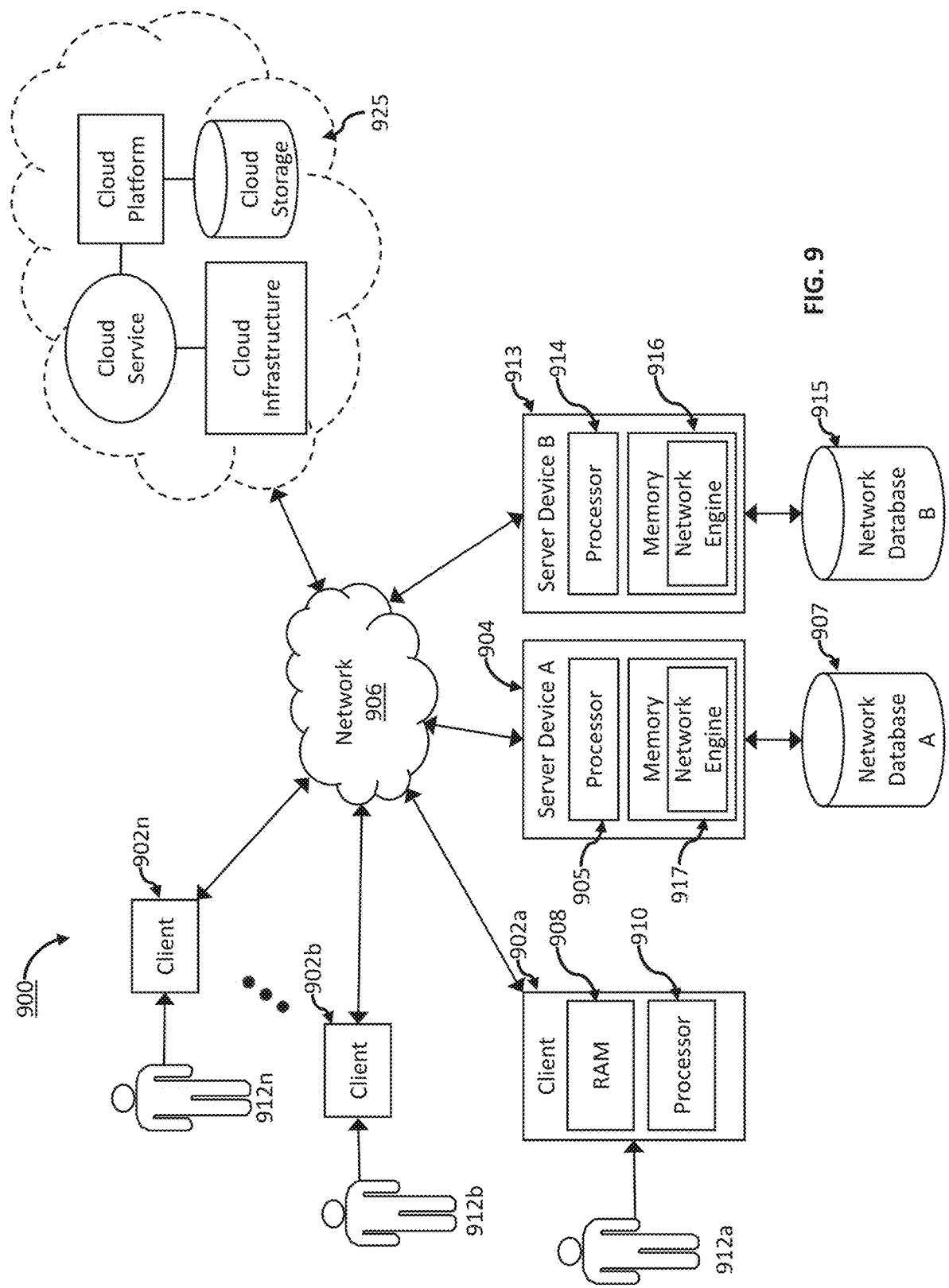
FIG. 9 is a block diagram illustrating another exemplary computer-based system and platform, according to one or more embodiments of the present disclosure.

FIG. 9 depicts a block diagram of another exemplary computer-based system and platform 900 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 902a, member computing device 902b through member computing device 902n shown each at least includes a computer-readable medium, such as a random-access memory (RAM) 908 coupled to a processor 910 or FLASH memory. In some embodiments, the processor 910 may execute computer-executable program instructions stored in memory 908. In some embodiments, the processor 910 may include a microprocessor, an ASIC, and/or a state machine. In some embodiments, the processor 910 may include, or may be in communication with, media, for example computer-readable media, which stores instructions that, when executed by the processor 910, may cause the processor 910 to perform one or more steps described herein. In some embodiments, examples of computer-readable media may include, but are not limited to, an electronic, optical, magnetic, or other storage or transmission device capable of providing a processor, such as the processor 910 of client 902a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 902a through 902n may also comprise a number of external or internal devices such as a mouse, a CD-ROM, DVD, a physical or virtual keyboard, a display, or other input or output devices. In some embodiments, examples of member computing devices 902a through 902n (e.g., clients) may be any type of processor-based platforms that are connected to a network 906 such as, without limitation, personal computers, digital assistants, personal digital assistants, smart phones, pagers, digital tablets, laptop computers, Internet appliances, and other processor-based devices. In some embodiments, member computing devices 902a through 902n may be specifically programmed with one or more application programs in accordance with one or more principles/methodologies detailed herein. In some embodiments, member computing devices 902a through 902n may operate on any operating system capable of supporting a browser or browser-enabled application, such as Microsoft™, Windows™, and/or Linux. In some embodiments, member computing devices 902a through 902n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 902a through 902n, user 912a, user 912b through user 912n, may communicate over the exemplary network 906 with each other and/or with other systems and/or devices coupled to the network 906. As shown in FIG. 9, exemplary server devices 904 and 913 may include processor 905 and processor 914, respectively, as well as memory 917 and memory 916, respectively. In some embodiments, the server devices 904 and 913 may be also coupled to the network 906. In some embodiments, one or more member computing devices 902a through 902n may be mobile clients.

In some embodiments, at least one database of exemplary databases 907 and 915 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 10:
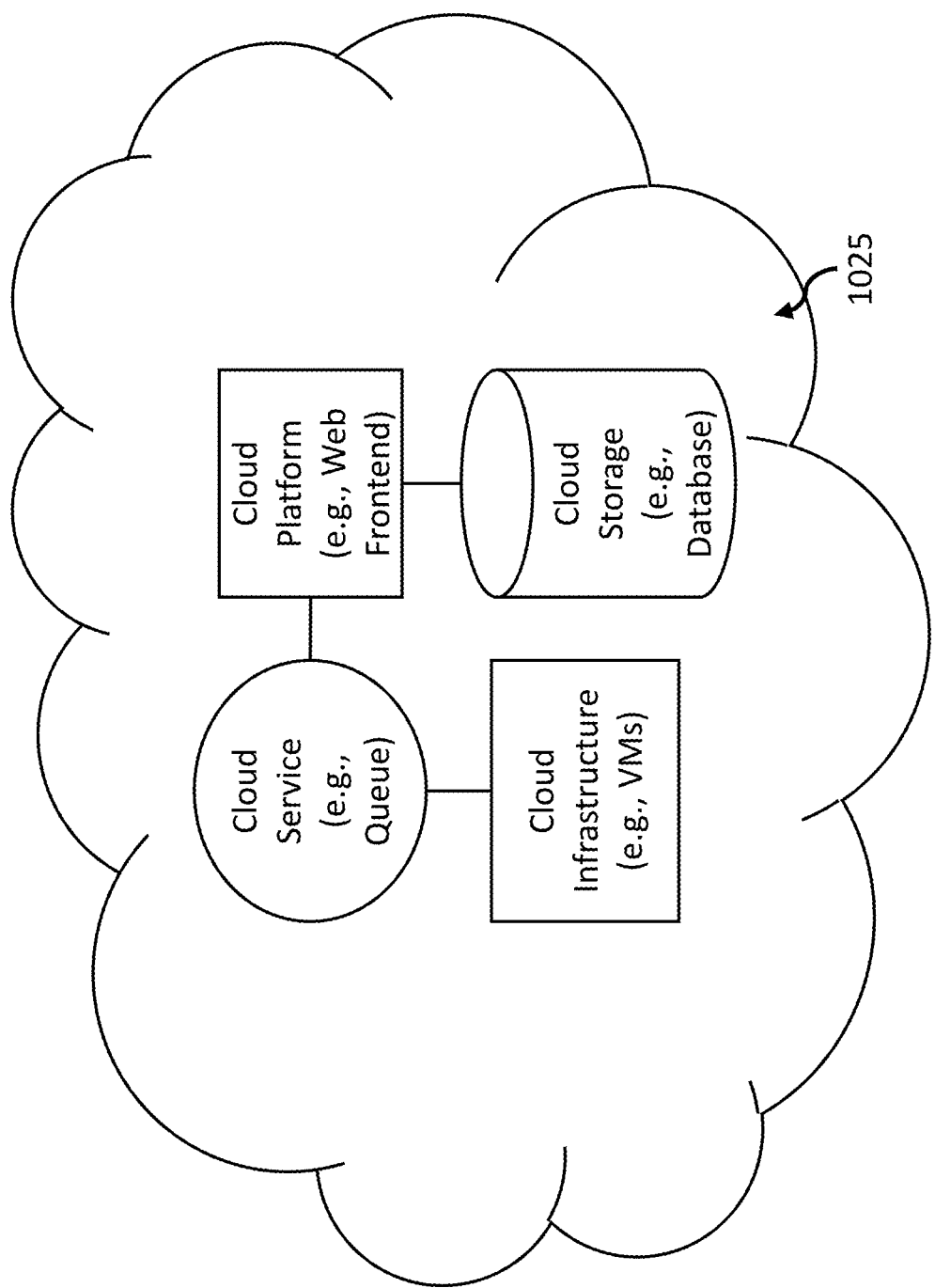
FIG. 10 is a schematic illustration of an exemplary implementation of a cloud computing/architecture(s) in which the exemplary inventive computer-based system and platform of the present disclosure may be specifically configured to operate, according to one or more embodiments of the present disclosure.
Figure 11:
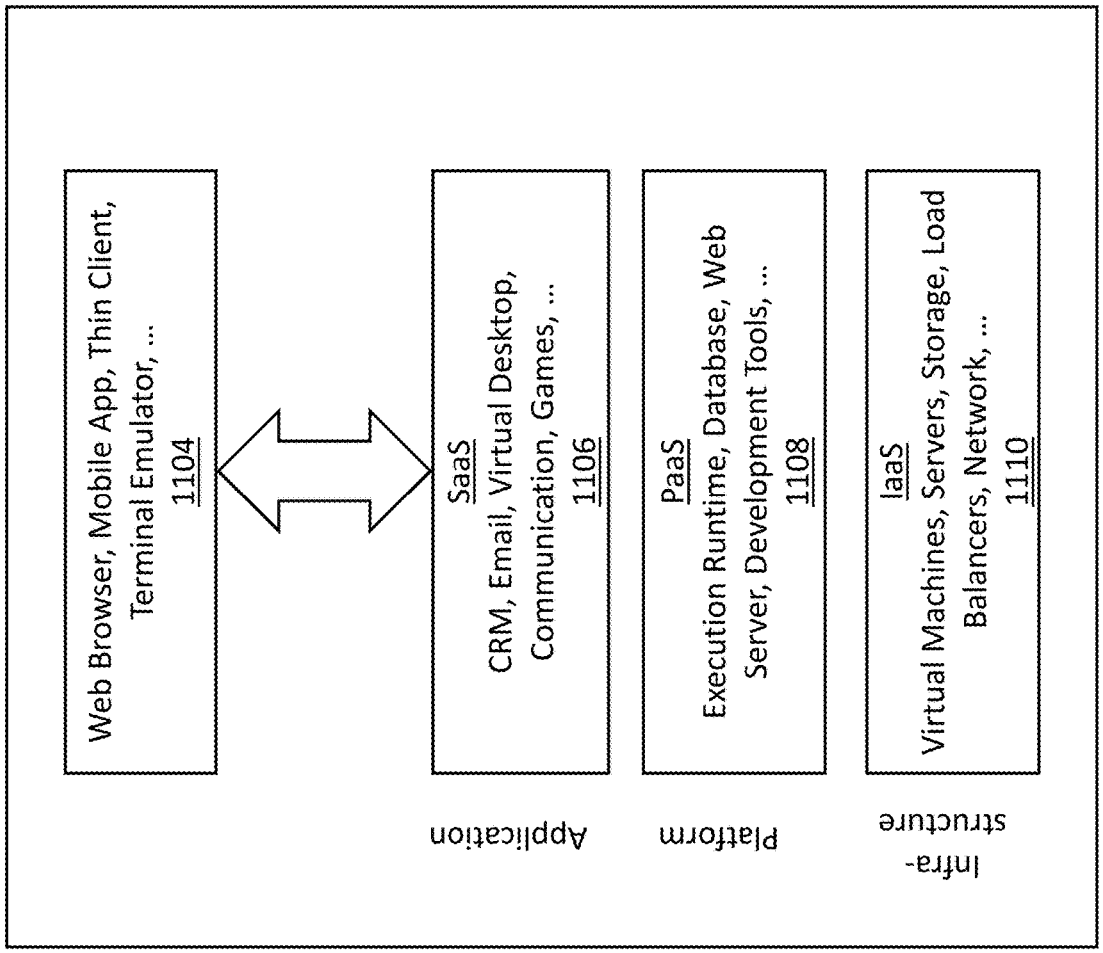
FIG. 11 is another schematic illustration of an exemplary implementation of a cloud computing/architecture(s) in which the exemplary inventive computer-based system and platform of the present disclosure may be specifically configured to operate, according to one or more embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 1025 such as, but not limiting to: infrastructure a service (IaaS) 1110, platform as a service (PaaS) 1108, and/or software as a service (SaaS) 1106 using a web browser, mobile app, thin client, terminal emulator or other endpoint 1104. FIGS. 10 and 11 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24).NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A method including:
   instructing, by at least one processor of a provider server, a computing device of a user to determine when a webpage is loaded via a web browser;
   where the web browser includes at least one of:
     a plug-in associated with the provider server or
     an extension associated with the provider server;
       where the provider server is associated with a first entity;
     where the plug-in or the extension is configured to request and receive a unique schema-specific identifier from the provider server;
       where the unique schema-specific identifier is associated with a user profile of the user,
         where the user profile is associated with the first entity;
   instructing, by the at least one processor, the computing device of the user to determine, via the at least one of plug-in or extension, that the webpage is a particular webpage configured to accept a particular information based on a determination that the webpage includes at least one webpage field to be populated with user particular information;
   determining, by the at least one processor, that the particular webpage is associated with a look-alike domain name based on at least one of:
     comparing a domain name of the particular webpage with at least one domain name of at least one second entity associated with at least one previously used unique schema-specific identifier associated with the user or at least one other user, or
     comparing the domain name of the particular webpage with at least one domain name of at least one third entity with at least one activity performed by the user or the at least one other user;
   performing, by the at least one processor, at least one action of:
     preventing the web browser from populating the at least one webpage field;
     preventing a generation of the unique schema-specific identifier;
     preventing a transmission of the unique schema-specific identifier to the at least one of the plug-in or the extension.

2. The method of clause 1, where the webpage includes at least one of a document object model (DOM) or a uniform resource locator (URL).

3. The method of clause 2, further including:
   instructing, by the at least one processor, the computing device of the user to analyze the DOM to identify a first element in the DOM;
   instructing, by the at least one processor, the computing device of the user to determine, based on the first element, that the webpage is configured to accept payments.

4. The method of clause 2, further including:
   instructing, by the at least one processor, the computing device of the user to analyze the URL to identify a second element in the URL;
   instructing, by the at least one processor, the computing device of the user to determine, based on the second element, that the webpage is configured to accept payments.

5. The method of clause 1, where the determination that the particular webpage is associated with the look-alike domain name is based on a prediction by a machine learning engine employing a binary classification model.

6. The method of clause 5, where the machine learning engine is trained on sets of authentic particular webpages and malicious particular webpages including second look-alike domain names.

7. The method of clause 1, further including:
   determining, by the at least one processor, whether an owner of the domain name of the particular webpage matches an owner of the first look-alike domain name.

8. The method of clause 1, further including:
   instructing, by the at least one processor, the computing device of the user to display a warning, on a display screen of the computing device of the user, that the particular webpage may be a malicious webpage.

9. The method of clause 1, further including:
   instructing, by the at least one processor, the computing device of the user to take a particular webpage image of the particular webpage;
   applying, by the at least one processor, at least one computer visual recognition technique to the particular webpage image to recognize at least one of a data object or subject within the particular webpage image;
   searching, by the at least one processor, a activity database of the provider server to identify a matching image;
   determining, by the at least one processor, a matching image domain name associated with the matching image;
   comparing, by the at least one processor, the matching image domain name to the domain name of the particular webpage to determine if there is a match.

10. The method of clause 1, further including storing, by the at least one processor, the look-alike domain name in a activity database of the provider server.

11. A system including:
    a computing device of a provider server configured to execute software instructions that cause the computing device to at least:
      instruct a computing device of a user to determine when a webpage is loaded via a web browser;

where the web browser includes at least one of:
a plug-in associated with the provider server or an extension associated with the provider server;
where the provider server is associated with a first entity;
where the plug-in or the extension is configured to request and receive a unique schema-specific identifier from the provider server;
where the unique schema-specific identifier is associated with a user profile of the user,
where the user profile is associated with the first entity;
instruct the computing device of the user to determine, via the at least one of plug-in or extension, that the webpage is a particular webpage configured to accept particular information based on a determination that the webpage includes at least one webpage field to be populated with user particular information;
determine that the particular webpage is associated with a look-alike domain name based on at least one of:
comparing a domain name of the particular webpage with at least one domain name of at least one second entity associated with at least one previously used unique schema-specific identifier associated with the user or at least one other user, or
comparing the domain name of the particular webpage with at least one domain name of at least one third entity with at least one activity performed by the user or the at least one other user;
perform at least one action of:
preventing the web browser from populating the at least one webpage field;
preventing a generation of the unique schema-specific identifier;
preventing a transmission of the unique schema-specific identifier to the at least one of the plug-in or the extension.

12. The system of clause 11, where the webpage includes at least one of a document object model (DOM) or a uniform resource locator (URL).

13. The system of clause 12, where the software instructions, when executed, further cause the computing device to perform steps to:
analyze the DOM to identify a first element in the DOM;
determine based on the first element, that the webpage is configured to accept payments.

14. The system of clause 12, where the software instructions, when executed, further cause the computing device to perform steps to:
analyze the URL to identify a second element in the URL;
determine based on the second element, that the webpage is configured to accept payments.

15. The system of clause 11, where the determination that the particular webpage is associated with the look-alike domain name is based on a prediction by a machine learning engine employing a binary classification model.

16. The system of clause 15, where the machine learning engine is trained on sets of authentic particular webpages and malicious particular webpages including second look-alike domain names.

17. The system of clause 11, where the software instructions, when executed, further cause the computing device to perform steps to:
receive a determination as to whether an owner of the domain name of the particular webpage matches an owner of the first look-alike domain name.

18. The system of clause 11, where the software instructions, when executed, further cause the computing device to perform steps to:
display a warning, on a display screen of the computing device of the user, that the particular webpage may be a malicious webpage.

19. The system of clause 11, where the software instructions, when executed, further cause the computing device to perform steps to:
instruct the computing device of the user to take a particular webpage image of the particular webpage;
apply at least one computer visual recognition technique to the particular webpage image to recognize at least one of a data object or subject within the particular webpage image;
search a activity database of the provider server to identify a matching image;
determine a matching image domain name associated with the matching image;
compare the matching image domain name to the domain name of the particular webpage to determine if there is a match.

20. A method including:
instructing, by at least one processor of a provider server, a computing device of a user to determine when a user interface is loaded via an application;
where the application is configured to request and receive a unique schema-specific identifier from the provider server;
where the unique schema-specific identifier is associated with a user profile of the user;
where the user profile is associated with a first entity;
instructing, by the at least one processor, the computing device of the user to determine that the user interface is configured to accept particular information based on a determination that the user interface includes at least one field to be populated with user particular information;
determining, by the at least one processor, that the application is a look-alike application based on at least one of:
comparing the application to at least one legitimate application of at least one second entity associated with at least one previously used unique schema-specific identifier associated with the user or at least one other user, or
comparing the application to at least one legitimate application of at least one third entity associated with at least one activity performed by the user or the at least one other user;
performing, by the at least one processor, at least one action of:
preventing the application from populating the at least one field;
preventing a generation of the unique schema-specific identifier;
preventing a transmission of the unique schema-specific identifier to the application.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:
instructing, by at least one processor of a provider server, a computing device of a user to determine when a webpage is loaded via a web browser;
wherein the web browser comprises at least one of:
a plug-in associated with the provider server or
an extension associated with the provider server;
wherein the provider server is associated with a first entity;
wherein the plug-in or the extension is configured to request and receive a unique schema-specific identifier from the provider server;
wherein the unique schema-specific identifier is associated with a user profile of the user,
wherein the user profile is associated with the first entity;
instructing, by the at least one processor, the computing device of the user to determine, via the at least one of plug-in or extension, that the webpage is a particular webpage configured to accept a particular information based on a determination that the webpage comprises at least one webpage field to be populated with user particular information;
retrieving, by the at least one processor, a list of domain names at which the user previously used the unique schema-specific identifier;
determining, by the at least one processor, that the particular webpage is associated with a look-alike domain name based on comparing a domain name of the particular webpage with each of the list of domain names; and
performing, by the at least one processor based on determining that the particular webpage is associated with a look-alike domain name, at least one action selected from a group comprising:
A. preventing the web browser from populating the at least one webpage field;
B. preventing a generation of the unique schema-specific identifier; and
C. preventing a transmission of the unique schema-specific identifier to the at least one of the plug-in or the extension,
wherein the selection includes one or more of action A, action B and/or action C.

2. The method of claim 1, wherein the webpage comprises at least one of a document object model (DOM) or a uniform resource locator (URL).

3. The method of claim 2, further comprising:
instructing, by the at least one processor, the computing device of the user to analyze the DOM to identify a first element in the DOM; and
instructing, by the at least one processor, the computing device of the user to determine, based on the first element, that the webpage is configured to accept payments.

4. The method of claim 2, further comprising:
instructing, by the at least one processor, the computing device of the user to analyze the URL to identify a second element in the URL; and
instructing, by the at least one processor, the computing device of the user to determine, based on the second element, that the webpage is configured to accept payments.

5. The method of claim 1, wherein the determination that the particular webpage is associated with the look-alike domain name is based on a prediction by a machine learning engine employing a binary classification model.

6. The method of claim 5, wherein the machine learning engine is trained on sets of authentic particular webpages and malicious particular webpages comprising second look-alike domain names.

7. The method of claim 1, further comprising:
determining, by the at least one processor, whether an owner of the domain name of the particular webpage matches an owner of the look-alike domain name.

8. The method of claim 1, further comprising:
instructing, by the at least one processor, the computing device of the user to display a warning, on a display screen of the computing device of the user, that the particular webpage may be a malicious webpage.

9. The method of claim 1, further comprising:
instructing, by the at least one processor, the computing device of the user to take a particular webpage image of the particular webpage;
applying, by the at least one processor, at least one computer visual recognition technique to the particular webpage image to recognize at least one of a data object or subject within the particular webpage image;
searching, by the at least one processor, a activity database of the provider server to identify a matching image;
determining, by the at least one processor, a matching image domain name associated with the matching image; and
comparing, by the at least one processor, the matching image domain name to the domain name of the particular webpage to determine if there is a match.

10. The method of claim 1, further comprising storing, by the at least one processor, the look-alike domain name in a activity database of the provider server.

11. A system comprising:
a computing device of a provider server configured to execute software instructions that cause the computing device to at least:
instruct a computing device of a user to determine when a webpage is loaded via a web browser;
wherein the web browser comprises at least one of:
a plug-in associated with the provider server or an extension associated with the provider server;
wherein the provider server is associated with a first entity;
wherein the plug-in or the extension is configured to request and receive a unique schema-specific identifier from the provider server;
wherein the unique schema-specific identifier is associated with a user profile of the user,
wherein the user profile is associated with the first entity;
instruct the computing device of the user to determine, via the at least one of plug-in or extension, that the webpage is a particular webpage configured to accept particular information based on a determination that the webpage comprises at least one webpage field to be populated with user particular information;

retrieve a list of domain names at which the user previously used the unique schema-specific identifier;

determine that the particular webpage is associated with a look-alike domain name based on comparing a domain name of the particular webpage with each of the list of domain names; and perform, based on determining that the particular webpage is associated with the look-alike domain name, at least one action selected from a group comprising:

A. preventing the web browser from populating the at least one webpage field;

B. preventing a generation of the unique schema-specific identifier; and

C. preventing a transmission of the unique schema-specific identifier to the at least one of the plug-in or the extension, wherein the selection includes one or more of action A, action B and/or action C.

12. The system of claim 11, wherein the webpage comprises at least one of a document object model (DOM) or a uniform resource locator (URL).

13. The system of claim 12, wherein the software instructions, when executed, further cause the computing device to perform steps to:

analyze the DOM to identify a first element in the DOM; and determine based on the first element, that the webpage is configured to accept payments.

14. The system of claim 12, wherein the software instructions, when executed, further cause the computing device to perform steps to:

analyze the URL to identify a second element in the URL; and determine based on the second element, that the webpage is configured to accept payments.

15. The system of claim 11, wherein the determination that the particular webpage is associated with the look-alike domain name is based on a prediction by a machine learning engine employing a binary classification model.

16. The system of claim 15, wherein the machine learning engine is trained on sets of authentic particular webpages and malicious particular webpages comprising second look-alike domain names.

17. The system of claim 11, wherein the software instructions, when executed, further cause the computing device to perform steps to:

receive a determination as to whether an owner of the domain name of the particular webpage matches an owner of the look-alike domain name.

18. The system of claim 11, wherein the software instructions, when executed, further cause the computing device to perform steps to:

display a warning, on a display screen of the computing device of the user, that the particular webpage may be a malicious webpage.

19. The system of claim 11, wherein the software instructions, when executed, further cause the computing device to perform steps to:

instruct the computing device of the user to take a particular webpage image of the particular webpage;

apply at least one computer visual recognition technique to the particular webpage image to recognize at least one of a data object or subject within the particular webpage image;

search a activity database of the provider server to identify a matching image;

determine a matching image domain name associated with the matching image; and compare the matching image domain name to the domain name of the particular webpage to determine if there is a match.

20. A method comprising:

instructing, by at least one processor of a provider server, a computing device of a user to determine when a webpage is loaded via an application;

wherein the application comprises at least one of:
a plug-in associated with the provider server, or
an extension associated with the provider server;
wherein the provider server is associated with a first entity;
wherein the plug-in or the extension is configured to request and receive a unique schema-specific identifier from the provider server;
wherein the unique schema-specific identifier is associated with a user profile of the user;
wherein the user profile is associated with the first entity;

instructing, by the at least one processor, the computing device of the user to determine, via the at least one of plug-in or extension, that the webpage is a particular webpage configured to accept particular information based on a determination that the webpage comprises at least one field to be populated with user particular information;

retrieving, by the at least one processor, a list of domain names at which the user previously used the unique schema-specific identifier;

determining, by the at least one processor, that the particular webpage is associated with a look-alike domain name based on comparing a domain name of the particular webpage with each of the list of domain names; and performing, by the at least one processor based on determining that the particular webpage is associated with the look-alike domain name, at least one action selected from a group comprising:

A. preventing the application from populating the at least one field;

B. preventing a generation of the unique schema-specific identifier;

C. preventing a transmission of the unique schema-specific identifier to the at least one of the plug-in or the extension, wherein the selection includes one or more of action A, action B and/or action C.

* * * * *